United States Patent [19]

Kepple et al.

[11] Patent Number: 4,571,997
[45] Date of Patent: Feb. 25, 1986

[54] FLOW MEASURING APPARATUS

[75] Inventors: Larry G. Kepple, Palo Cedro; Samuel L. Smith, Redding, both of Calif.

[73] Assignee: Professional Associated Consulting Engineers Incorporated, Redding, Calif.

[21] Appl. No.: 622,837

[22] Filed: Jun. 21, 1984

[51] Int. Cl.$^4$ ................................................ G01F 1/36
[52] U.S. Cl. .................................................... 73/215
[58] Field of Search .................. 73/215, 216, 300-302, 73/40.5 R

[56] References Cited

U.S. PATENT DOCUMENTS

| | | | |
|---|---|---|---|
| 4,034,607 | 7/1977 | Martig, Jr. | 73/215 |
| 4,367,652 | 1/1983 | Venuso | 73/215 |

FOREIGN PATENT DOCUMENTS 2424454  11/1975  Fed. Rep. of Germany ........ 73/215

*Primary Examiner*—Donald O. Woodiel
*Attorney, Agent, or Firm*—Leonard D. Schappert

[57] ABSTRACT

A flow measuring apparatus adapted to be installed temporarily in the end of a sewer pipe or water pipe or conduit is provided with a weir/orifice plate and a bubble tube for sensing the hydraulic pressure at a critical point below the weir/orifice plate to facilitate determination of the flow rate by a calibrated relationship with the measured pressure. A cylindrical support frame is provided for placement in the pipe outlet, together with an inflatable collar which, when inflated, provides a seal between the inside diameter of the outlet pipe and the support frame. A base weir/orifice plate is fixed across the upstream face of the support frame and means are provided for fastening interchangeable weir-/orifice plates to the base weir/orifice plate. An extension handle is provided so that the operator can install the measuring device in an exposed pipe or conduit located in a vault or manhole without entering the vault or manhole.

13 Claims, 4 Drawing Figures

4,571,997

FLOW MEASURING APPARATUS

BACKGROUND OF THE INVENTION

1. Field of the Invention

This invention relates generally to the accurate measuring of the fluid flow rate in pipes and conduits, and more particularly to the flow in gravity sewer systems. The apparatus is portable and lightweight, and can be used to measure the flow rate in a buried pipeline without requiring the operator to enter the manhole. The device can easily be inserted into a flowing pipe well below street grade, and flow measurements can be taken quickly. Carefully calibrated weir/orifice plates allow measurement of a wide range of flows during both free flow through the apparatus, when the weir/orifice plate acts as a weir, and low-pressure flow through the apparatus, when the weir/orifice plate acts as an orifice, as well as in the transitional zone therebetween.

2. Description of the Prior Art

Heretofore, relevant art has taught flow measuring devices that require the temporary installation of a weir or flume together with a device which detects the liquid depth upstream of the weir or flume and then converts the depth to rate of flow. Such an installation requires individuals to enter the manhole and invest considerable time and labor in positioning the metering device, diverting the flow into the device and calibrating the liquid depth measuring device. Previous weir or flume devices are limited in their flow range because in high-flow conditions they become submerged and lose their flow measuring characteristics. An assembly containing an integral weir/orifice which can measure both free-flow conditions and surcharged conditions, as well as conditions in the transitional zone, and which is portable, easily installed from ground level and quickly sealed in the flow path upon insertion into the subject pipe or conduit, is highly desirable. However, although the need for such a device has been apparent for a considerable time, no such device has been forthcoming until now.

SUMMARY OF THE INVENTION

The present invention is a flow measuring device for temporary installation in an inlet pipe to a sewer well or manhole. With minor modifications it can also be used on the outlet pipe of a sewer manhole or well, or in any conduit where flow is to be measured. An extension handle of adjustable length is attached to the cylindrical sensing device so that it can be positioned in a conduit from the ground surface. Means are mounted on the upstream surface of the sensing device to provide a predetermined flow measuring cross section therein using a weir or orifice. An inflatable collar surrounds a cylindrical support frame so that, when the sensing device is placed in the inlet pipe and the inflatable collar is inflated, generally with air, a seal is provided therebetween so that the entire flow from the inlet pipe passes through the weir or orifice. A bubble tube or other communicating means supported by the handle and sensing device is terminated directly below the invert of the weir or orifice for supplying sensing gas (normally air) under pressure. Flow data are obtained by means of conversion of the fluid pressure measured immediately upstream of the flow cross section to flow rates via either calibration curves or calibrated scales on a manometer, gauge or other indicating means. Such curves or scales are developed from tests using a proven flow measuring device to determine actual rates and observed pressures.

One of the objects of the present invention is to provide a lightweight, portable, easy-to-use flow measuring apparatus for quick installation in a pipe of a sewer manhole or other open pipe.

Another object of the present invention is to provide a flow measuring apparatus which accurately measures free-flowing gravity conditions, surcharged pressure conditions and the transitional zone therebetween.

Another object of the present invention is to provide a flow measuring apparatus which is easily calibrated with a simple, hand-operated bubble tube and bulb pump.

Another object of the present invention is to provide a flow measuring device with a bubble tube outlet or other sensing means which is placed below the center of the weir/orifice cross section and immediately upstream in such a position that the pressure sensed by the device in the free-discharge condition during low flows will be similar to that measured upstream under conventional criteria for a weir.

Another object of the present invention is to provide a flow measuring apparatus which utilizes detachable v-notch weir/orifice plates configured so that accurate flow measurements can be obtained in both the free-flowing weir condition and the pressurized orifice condition, with different weir/orifice plates and the same sensing line.

A further object of the present invention is to provide a flow measuring apparatus which, because of its unique construction and operation, increases accuracy of measurement, while at the same time decreasing the operator's time and energy required to make such measurements.

The foregoing objects, as well as other objects and benefits of the present invention, are made more apparent by the descriptions and claims which follow.

DESCRIPTION OF THE PREFERRED EMBODIMENT

Figure 1:
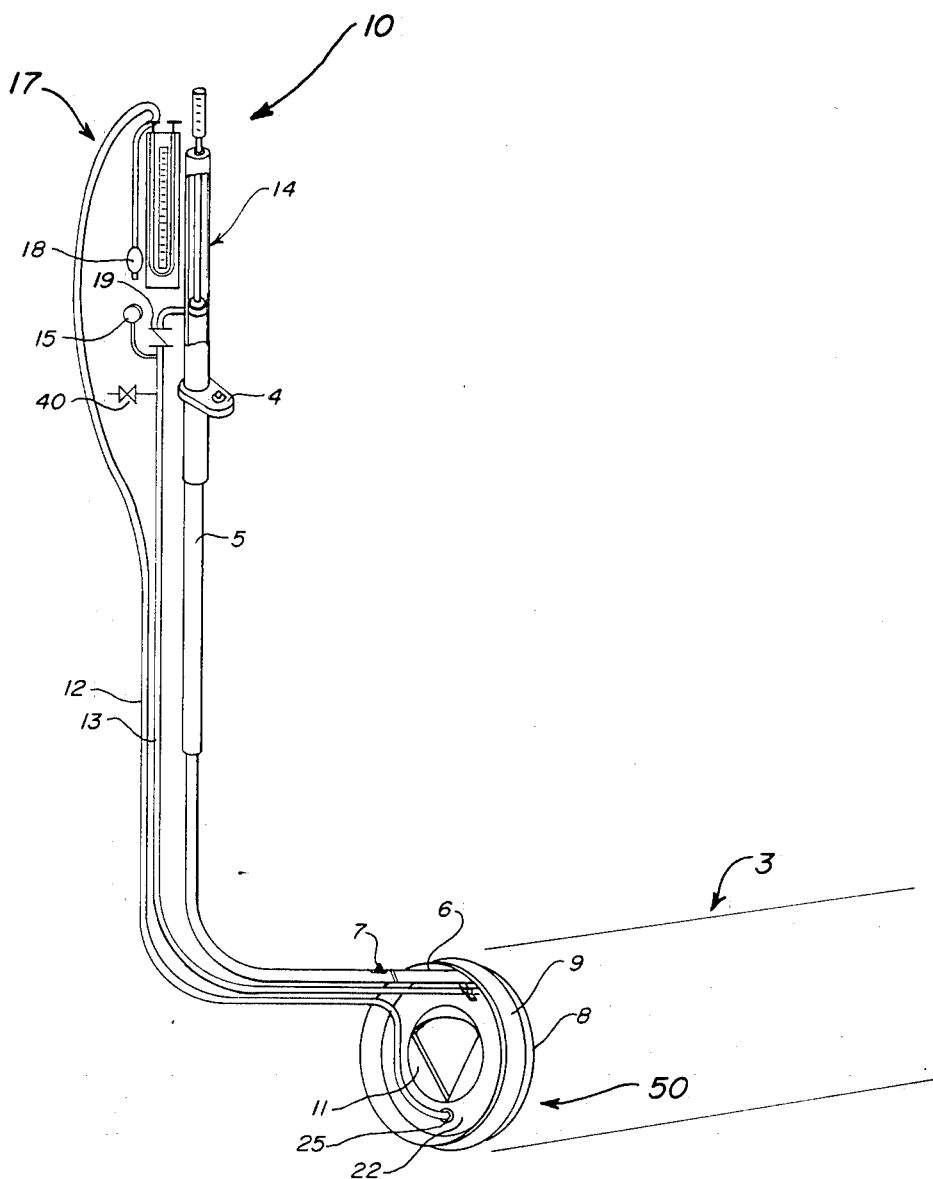
FIG. 1 is a perspective view showing the flow measuring apparatus in position to measure fluid flow in a conduit.
Figure 4:
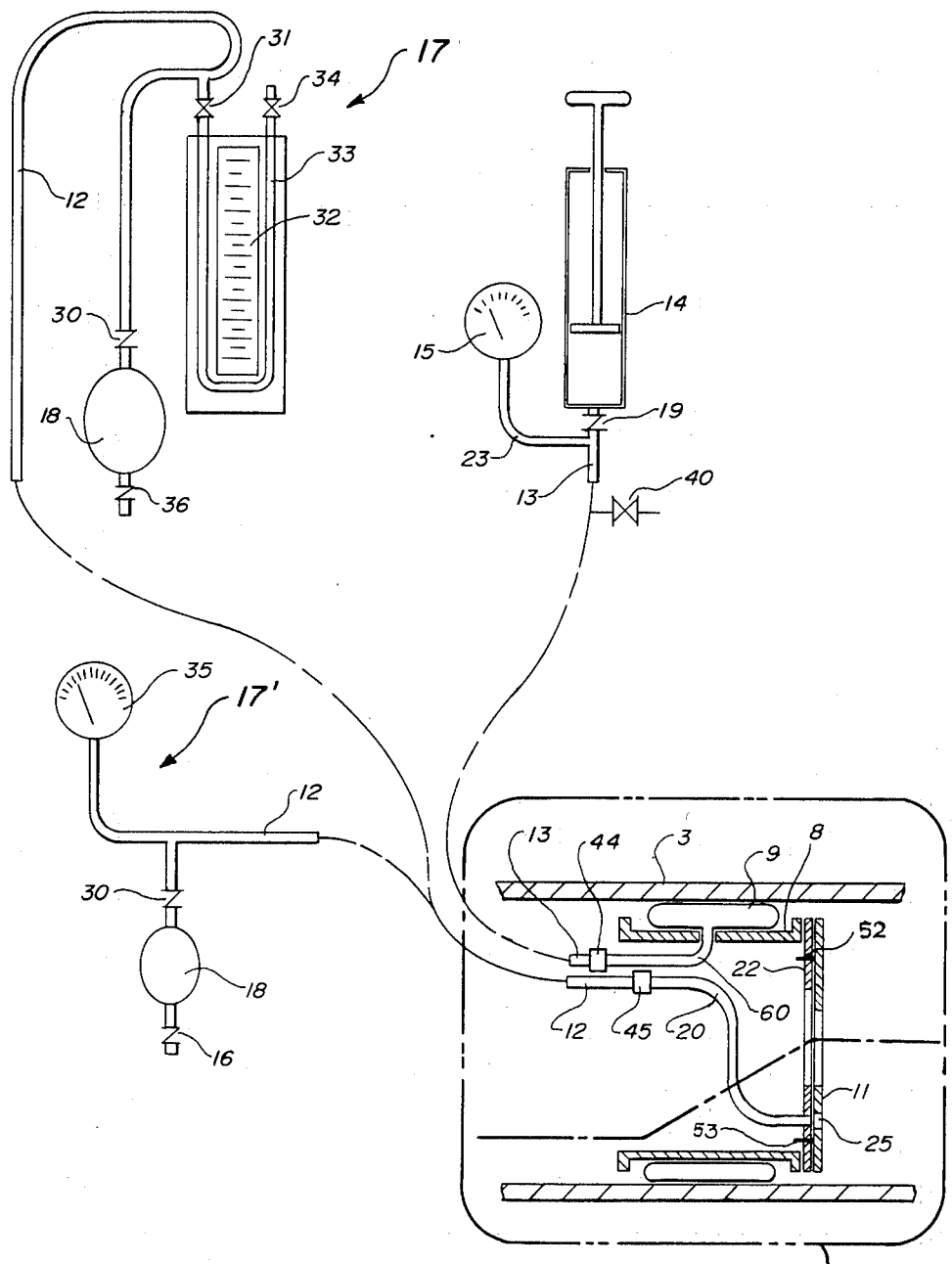
FIG. 4 is an operational view illustrating a cross section of the sensing device in place in a conduit, taken along lines 4A—4A of FIG. 2, and its interconnection with the bubbler supply tube, additionally showing the inflatable collar gas supply tube and alternative flow indicating devices.

FIGS. 1 and 4 of the drawings illustrate a flow measuring apparatus 10 for measuring fluid flow in a sewer or water pipe or conduit. The flow measuring apparatus 10 includes flow sensing means 50, attached to telescoping extension handle 5 by means of mounting bracket 6 and quick connect/disconnect means 7, and flow level indicating means 17, attached to telescoping extension handle 5. Telescoping extension handle 5 passes through the cover of a manhole (not shown), and flow sensing means 50 is shown in FIG. 1 in position in the open end of the upstream portion of a conduit 3. An inflatable collar 9 surrounds support frame 8 and inflates to hold flow sensing means 50 in place in conduit 3 and to act as a seal between support frame 8 and conduit 3. Inflatable collar 9 has a gas supply tube 13 which leads to a pump 14 mounted at the top of telescoping extension handle 5. Air pressure in inflatable collar 9 is indicated by pressure gauge 15. Check valve 19 provides positive means to maintain pressure in inflatable collar 9, and bypass valve 40 provides means to depressurize inflatable collar 9. A base weir/orifice plate 22 is mounted in support frame 8 and sealed on the upstream side of support frame 8. When such is desired, a detachable weir/orifice plate 11 having a triangular opening 38 therein can be mounted on the upstream side of base weir/orifice plate 22.

It was determined in the course of research and testing that a v-notch weir, closed at the top to form a somewhat triangular orifice such as is used in detachable weir/orifice plate 11, could be used as both a weir at low flows and an orifice at higher flows, and could also measure flow in the transitional zone between low and high flows. Round orifices could be used similarly. With the attachment of a smaller weir/orifice (usually a triangle with a rounded top) over a larger weir/orifice (usually a round hole), the sensing device can measure a large range of flows.

A pressure sensing tube outlet 25 is positioned just below the apex or invert of detachable weir/orifice plate 11. Testing has revealed that, when pressure sensing tube outlet 25 is located in this position, the pressure sensed is substantially equal to that normally sensed three flow depths above detachable weir/orifice plate 11. Sensing pressure at this point ensures simplicity without sacrificing accuracy. Bubbler supply tube 12 communicates pressure sensed by pressure sensing tube outlet 25 to flow level indicating means 17, which consists of a fluid manometer 33 or pressure gauge 35 calibrated to read flow. Bubbler supply pump 18 is provided to facilitate calibration of flow level indicating means 17. A level indicator 4 mounted on telescoping extension handle 5 indicates the orientation of flow sensing means 50 and the vertical position of telescoping extension handle 5.

Figure 2:
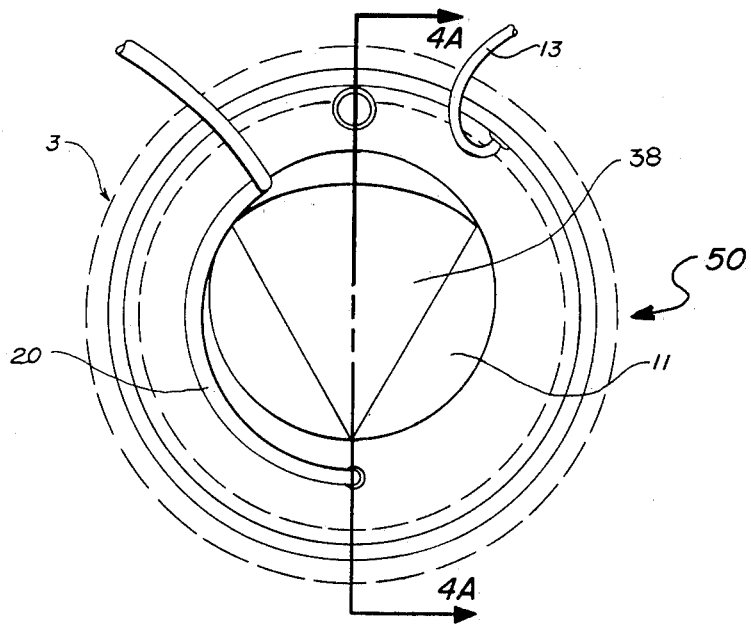
FIG. 2 is an end view of the sensing device of FIG. 1 showing the upstream detachable weir/orifice plate installed.

FIG. 2 shows flow sensing means 50 from the downstream end as mounted in conduit 3, showing more clearly the location of sensor tube 20 and its outlet point directly below the center of the weir/orifice, as well as the position of other components of flow sensing means 50. Triangular opening 38 in detachable weir/orifice plate 11 is also illustrated.

Figure 3:
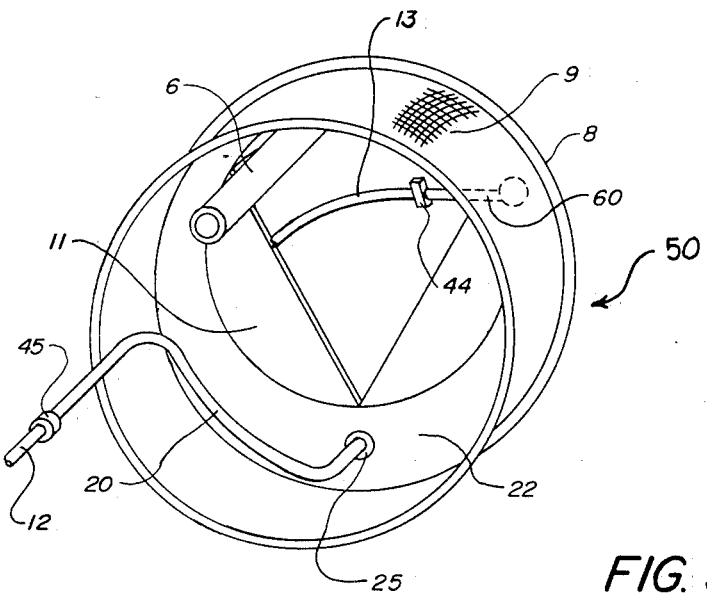
FIG. 3 is a perspective view of an embodiment of the sensing device showing further details of construction.

FIG. 3 is a perspective view of flow sensing means 50 from the downstream end showing more clearly mounting bracket 6, which connects to telescoping extension handle 5 by quick connect/disconnect means 7, also showing inflatable collar connector 44 and bubbler tube connector 45. These features allow quick interchange of flow sensing means 50 of various diameters for use with the same telescoping extension handle 5 and flow level indicating means 17. FIG. 3 further shows the relative positioning of inflatable collar 9 with respect to support frame 8, and the size and position of base weir/orifice plate 22 and detachable weir/orifice plate 11.

FIG. 4 is an operational view including a cross-sectional view of flow sensing means 50 in enclosed area "A" taken along lines 4A—4A of FIG. 2. As is shown in the cross section in enclosed area "A," detachable weir/orifice plate 11 attaches to base weir/orifice plate 22 by means of bolts 52 and 53. Pressure sensing tube outlet 25 is located just below the apex or invert of triangular opening 38 in detachable weir/orifice plate 11.

It was determined during testing that pressure sensed just below the apex or invert of the weir on the upstream face is substantially the same as that at the normal point of measurement for a weir which is usually upstream by three flow depths of the weir. Locating the pressure sensing tube outlet 25 just below and on the upstream face of the weir keeps the device simple, with no flow obstructions, and makes the orientation of flow sensing means 50 less critical than it would otherwise be.

Flow level indicating means 17 consists of a manometer 33 and related hardware as shown. Alternative flow level indicating means 17' consists of a pressure gauge 35 and associated hardware as shown.

Flow level indicating means 17 is operated and purged with a bubbler supply pump 18, with check valve 30 used to maintain the level indicating pressure in bubbler supply tube 12 and sensor tube 20. Pressure is released through check valves 30 and 36. Shutoff valves 31 and 34 provide control of manometer 33, enabling isolation of bubbler fluid during storage as desired. Graduated scale 32 on manometer 33 is calibrated to give accurate flow level readings, whether detachable weir/orifice plate 11 is operating as a weir or as an orifice, and is also calibrated to indicate accurately the flow level in the transitional zone.

When flow level indicating means 17' is used, pressure gauge 35 is calibrated with bubbler supply pump 18 and check valve 30 to "zero it out." Check valve 16 is provided to facilitate release of pressure from bubbler supply pump 18. The face of pressure gauge 35 is calrbrated to indicate accurately the level of flow, whether detachable weir/orifice plate 11 is operating as a weir or as an orifice, as well as that in the transitional zone.

While either flow level indicating means 17 or 17' can be used effectively, any other flow level indicating means capable of accurate indication and calibration could likewise be used.

In actual operation, flow sensing means 50 is passed down into a manhole and positioned in a conduit 3 through adjustment of the length of telescoping extension handle 5. This procedure gives the operator at ground level control of the placement of flow sensing means 50 in conduit 3. Bypass valve 40 at pump 14 is closed and inflatable collar 9 is inflated with pump 14 through check valve 19, gas supply tube 13, inflatable collar connector 44 and gas tube 60. Pressure on inflatable collar 9 is monitored at pressure gauge 15, which is attached to gas tube 13 through gas tube 23. Bypass valve 40 is opened to deflate inflatable collar 9. Once flow sensing means 50 is securely positioned, it is left in place until steady flow is achieved, at which point flow readings are recorded.

While the foregoing description of the invention has shown preferred embodiments using specific terms, such description is presented for illustrative purposes only. It is applicants' intention that changes and variations may be made without departure from the spirit or scope of the following claims, and this disclosure is not intended to limit applicants' protection in any way.

We claim:

1. A flow sensing device for installation in a conduit, comprising:

a hollow body, consisting of a substantially cylindrical support frame, having a flow path therethrough with an exit end and an inlet end;

an inflatable collar surrounding said support frame so that, when said hollow body is placed in said conduit and said inflatable collar is inflated, a seal is formed between said hollow body and said conduit;

a base weir/orifice plate mounted across said inlet end of said hollow body having an invert level positioned at a predetermined distance from the invert of said conduit;

pressure sensing means mounted on said base weir/orifice plate a predetermined distance below said invert level of said base weir/orifice plate;

a bubbler supply tube connected to said pressure sensing means, and pressure indicating means attached to said bubbler supply tube whereby pressure at said base weir/orifice plate is measured.

2. The apparatus of claim 1 wherein said base weir/orifice plate consists of a substantially circularly shaped weir/orifice plate, and including a detachable v-notch weir/plate attached to said weir/orifice plate and positioned a predetermined distance above said invert of said conduit, having an upper surface contoured so that flow measuring characteristics can be calibrated with the apparatus in free-flowing weir condition, in low-pressure orifice condition, and in the transitional zone therebetween.

3. The apparatus of claim 1, wherein said pressure sensing means is positioned directly below said invert of said base weir/orifice plate so that, when there is free flow through said base weir/orifice plate, the pressure sensed by said pressure sensing means approximates pressure which would be sensed upstream under conventional criteria for a weir.

4. A flow measuring apparatus, comprising:
a flow sensing device designed to be placed in a conduit, having:
a support frame;
a base weir/orifice plate having a hole therein to provide a predetermined flow cross-section;
an inflatable collar surrounding said support frame so that, when said inflatable collar is inflated, a seal is provided between said conduit and said support frame, and
pressure sensing means mounted on said flow sensing device; flow level indicating means;
communicating means communicating pressure at said pressure sensing means to said flow level indicating means,
whereby flow level can be monitored, and
a long handle which facilitates insertion of said flow sensing device into a sewer or other underground pipe system without an operator being required to enter a manhole.

5. The invention of claim 4, wherein said long handle is a telescoping handle.

6. The invention of claim 5, including a level indicator mounted on said telescoping handle indicating plumbness of orientation of said telescoping handle.

7. The invention of claim 6, wherein:
said base weir/orifice plate is a v-notch weir, and
said pressure sensing means is positioned just below the apex of said v-notch weir.

8. The invention of claim 5, wherein:
said base weir/orifice plate is a v-notch weir, and
said pressure sensing means is positioned just below the apex of said v-notch weir.

9. The invention of claim 4, including a level indicator mounted on said long handle indicating plumbness of orientation of said long handle.

10. The invention of claim 9, wherein:
said base weir/orifice plate is a v-notch weir, and
said pressure sensing means is positioned just below the apex of said v-notch weir.

11. The invention of claim 4, wherein:
said base weir/orifice plate is a v-notch weir, and
said pressure sensing means is positioned just below the apex of said v-notch weir.

12. The invention of claim 4, including a detachable weir/orifice plate attached to said base weir/orifice plate and having a hole therein to provide a predetermined flow cross-section which is less than said flow cross-section of said hole in said base weir/orifice plate.

13. A flow sensing device for installation in a conduit, comprising:
a hollow body, consisting of a substantially cylindrical support frame, having a flow path therethrough with an exit end and an inlet end;
an inflatable collar surrounding said support frame so that, when said hollow body is placed in said conduit and said inflatable collar is inflated, a seal is formed between said hollow body and said conduit;
a base weir/orifice plate mounted across said inlet end of said hollow body having an invert level positioned at a predetermined distance from the invert of said conduit;
a pressure sensing means mounted on said base weir/orifice plate a predetermined distance below said invert level of said base weir/orifice plate;
pressure indicating means attached to said pressure sensing means whereby pressure at said base weir/orifice plate is measured and translated to the environment at or above a manhole opening whereby flow at said pressure sensing means is determined on the basis of a predetermined calibration of flow and pressure, and
a long handle attached to said hollow body which facilitates insertion of said flow sensing device into a sewer or other underground pipe system without an operator being required to enter a manhole.

* * * * *